United States Patent [19]
Bergeron Dunn et al.

[11] Patent Number: 6,003,992
[45] Date of Patent: Dec. 21, 1999

[54] BACK LIGHTING ILLUMINATION SYSTEM

[75] Inventors: Sheila Pauline Bergeron Dunn, Mason; Michael Cordino Messina; Jonathan Charles Chouinard, both of Goffstown; Joseph Marcel Laflamme, New Boston, all of N.H.

[73] Assignee: Northeast Robotics LLC, Weare, N.H.

[21] Appl. No.: 09/089,305

[22] Filed: Jun. 2, 1998

[51] Int. Cl.$^6$ .................................................. A61B 3/10
[52] U.S. Cl. .................................................. 351/221
[58] Field of Search .................................. 351/206, 207, 351/212, 221; 356/376; 352/96, 97; 353/63, 65, DIG. 4; 362/3

[56] References Cited

U.S. PATENT DOCUMENTS

| | | | |
|---|---|---|---|
| 3,861,808 | 1/1975 | Halsey | 356/376 |
| 4,772,115 | 9/1988 | Gersten et al. | 351/212 |
| 4,863,260 | 9/1989 | Gersten et al. | 351/212 |

*Primary Examiner*—George Manuel
*Attorney, Agent, or Firm*—Davis and Bujold

[57] ABSTRACT

A back light illumination system for providing substantially uniform illumination to a surface of an object to be observed so that the object may be accurately perceived by a machine vision system. The back light illumination system includes a light transmissive element having a central light transmissive portion and an opaque perimeter portion. A diffuser is located to cover the entire light transmissive portion and a rear surface of the diffuser is provided with a transmissive right angle film. A pair of opposed light sources are provided for illuminating a rear surface of the transmissive right angle film to supply light to the diffuser which uniformly diffuses the light and provides lighting of a substantially equal intensity and character to the light transmissive portion of the light transmissive element so that the back light illumination system thereafter emits substantially uniform illumination. The light supplied from the light sources to the right angle film is generally supplied at a shallow angle of between 0° and 20°.

22 Claims, 3 Drawing Sheets

BACK LIGHTING ILLUMINATION SYSTEM

The invention relates an improved back lighting system for use with a machine vision system. In particular, the present invention provides a uniform back lighting illumination of an object so that the object may be accurately perceived by a machine vision system. A preferred use of the present invention is to back illuminate a translucent carrier containing one or more semiconductor wafers to provide a high contrast image for determining the presence/absence of each wafer as well as the position of each wafer within the translucent carrier.

BACKGROUND OF THE INVENTION

A number of back lighting illumination systems are currently known and some of the known back lighting illumination systems are capable of providing a substantially uniform illumination of an object for viewing, such as by a machine vision system, while other known back lighting illumination systems are not truly uniform. In particular, some of the known non-uniform back lighting illumination systems generate "hot spot" areas which are of a brighter intensity than the illumination supplied by the remaining area of the back lighting illumination system. This non-uniformity in illumination can cause false readings or perception by the machine vision system and is to be avoided.

In the known back lighting illumination systems which provide a substantially uniform illumination, they are very power intensive and employ a large array of illumination elements which increases their size. Further, the known systems generally do not efficiently use all of the supplied light to provide the uniform back lighting illumination. The prior art back lighting illumination systems also generate substantial heat during use.

SUMMARY OF THE INVENTION

Wherefore, it is an object of the present invention to overcome the aforementioned problems and drawbacks associated with the prior art designs.

Another object of the invention is to provide a back lighting illumination system which provides substantial uniform illumination to a surface of an object to be viewed so that the object may be accurately perceived by the machine vision system.

A still further object of the invention is to recess or conceal the illumination element or elements (such as light emitting diodes (LEDs)) in such a manner that the illumination elements cannot be directly viewed or supply any light directly to a lens or inlet pupil of a camera of a vision system to eliminate or minimize the creation of "hot spots".

Yet another object of the invention is to provide a pair of opposed rows of LEDs in which the LEDs are staggered such that the center of each LED is located directly across from a midpoint of two opposed adjacent LEDs to enhance significantly both the intensity and the uniformity of the illumination supplied to a rear surface of a diffuser and thereby improve upon the uniformity of illumination emitted by the back lighting illumination system.

A still further object of the invention is to minimize the apparent spacing between adjacent LEDs in an array to virtually eliminate any dark regions of the back light illumination system and thereby further enhance the uniformity and the intensity of the light emitted by the back lighting illumination system.

Still another object of the invention is to simplify the back light illumination arrangement so that the illumination system can provide the required back lighting in as small a package as possible.

A further object of the invention is to minimize the number of required LEDs to provide an extended uniform source over a given area while still providing the back light illumination system with the required intensity and uniformity.

The present invention relates to a back light illumination system for a machine vision system, said back light illumination system comprising: a light transmissive element having an opaque portion and a light transmissive portion; a diffuser substantially covering at least said light transmissive portion, and said diffuser having a first surface being located closely adjacent said light transmissive portion; a second opposed surface of said diffuser having a right angle film located closely adjacent thereto for redirecting light supplied to the right angle film through the diffuser; and at least one light source being located to illuminate a rear surface of said right angle transmissive film, said at least one illumination source being located so as to only indirectly illuminate a camera of a machine vision system.

The present invention also relates to a method of providing back light illumination for a machine vision system, said method comprising the steps of: providing a light transmissive element having an opaque portion and a central light transmissive portion; substantially covering at least said light transmissive portion with a diffuser, and said diffuser having a first surface being located closely adjacent said light transmissive portion; providing a right angle film closely adjacent to a second opposed surface of said diffuser for redirecting light supplied to the right angle film through the diffuser; and locating at least one light source to illuminate a rear surface of said right-angle transmissive film, said at least one illumination source being located so as to only indirectly illuminate a camera of a machine vision system.

The term "diffuse", as used in this specification and the appended claims, means a light source which is uniformly dispersed over a broad range of incident angle of azimuth and elevation with respect to the object being observed, with any discontinuities in such illumination field being of a sufficiently small size so as not to cause any noticeable difference in the appearance of the object being observed from that caused by a perfectly homogenous and continuous illumination field, and the light source provides substantial coverage of the illumination hemisphere over the area where the light is directed, i.e. greater than 50% of the possible angular range of incident light.

The term "concealed", as used in this specification and appended claims, when referring to the illumination elements, means that the illumination elements emitting the light are positioned such that the emitting surface of the illumination elements can not directly supply light to an inlet pupil of the camera, i.e. only indirect illumination of the inlet pupil of the camera via reflection and dispersal of light by both the right angle film and diffuser can occur.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
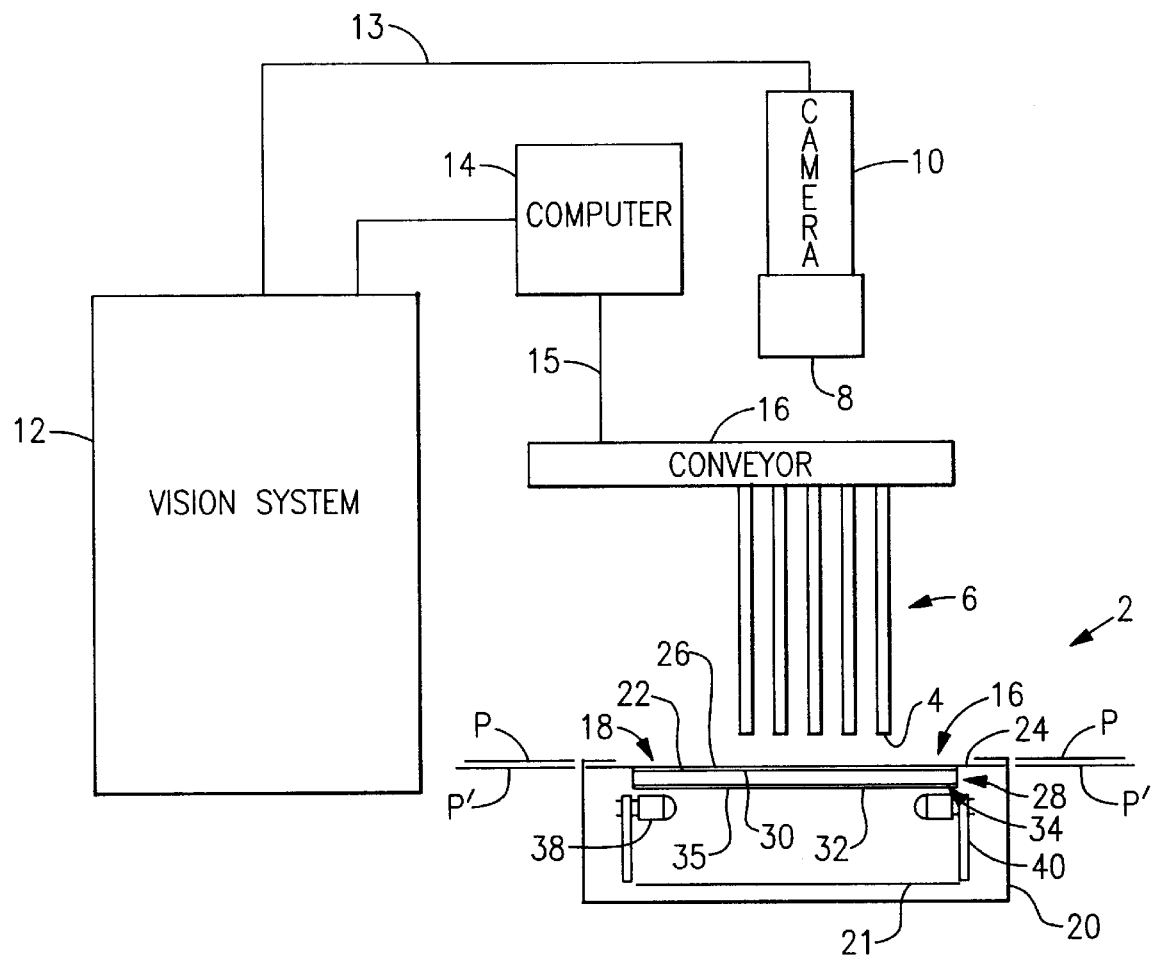
FIG. 1 is a diagrammatic view showing the back light illumination system according to the present invention.

Turning now to the FIG. 1, a detailed description concerning the improved back light illumination system 2, according to the present invention, will now be provided. As can be seen in FIG. 1, the back light illumination system 2 is utilized, in one application, to illuminate a rear surface 4 of an object(s) 6 to be observed or inspected, e.g. a semiconductor wafer on a translucent carrier, here shown on edge relative to the camera. The object 6 is positioned at a location between a lens 8 or entrance pupil of a camera 10, or some other observation device, and the back light illumination system 2 which, in turn, is coupled to a machine vision system 12, only diagrammatically shown in the drawing. The machine vision system 12 is coupled to the camera 10 in a conventional manner by a cable 13. The machine vision system 12 is also coupled to a computer 14 (only diagrammatically shown) for determining the sense image, e.g. by comparison of the sensed image with prior input images, characters, objects, shapes, indicia, etc. Once the profile of the object(s) 6 to be observed or inspected is determined by the system, the object(s) 6 can then be further manipulated by the system, e.g. the object can be accepted or rejected, sorted by size or type, package, conveyed, etc. depending upon the particular application. The computer 14 is typically electrically connected by a cable 15 to a motor which drives a conveyor 16 or some other transportation or conveying device for controlling further manipulation or manufacturing of the object 6, e.g. for inspection, transportation, processing, sorting orientation, etc. As the present invention relates specifically to the back light illumination system 2, a further detailed description concerning the machine vision system 12 will not be provided.

As a result of this illumination arrangement, some of the light supplied by the back light illumination system 2 toward the camera 10 will be blocked by the object 6 and this blocked light will be perceived by the machine vision system 12 as being a "dark area" while most of the remaining light, supplied by the back light illumination system 2, will reach the entrance pupil 8 of the camera 10 and be perceived by the machine vision system 12 as a "bright area".

Figure 2:
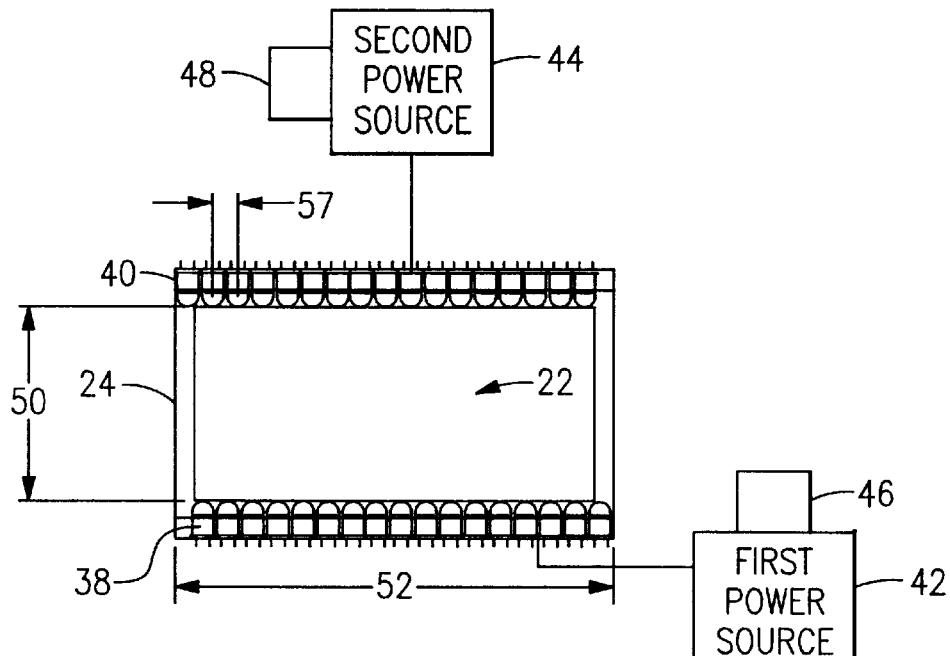
FIG. 2 is a diagrammatic plan view showing the arrangement of the illumination elements according to the present invention.

With reference to FIGS. 1 and 2, a more detailed description concerning the illumination arrangement of the back light illumination system 2, according to the present invention, will now be provided. As can be seen in this Figure, the back light illumination system 2 comprises a planar light transmissive barrier or element 18, such as a pane of glass or plexiglass or some other rigid but light transmissive element. Alternatively, the light transmissive element 18 could also be a central aperture provided in an otherwise opaque element. The light transmissive element 18 separates the back light illumination system 2 from the remainder of the surrounding environment. The light transmissive element 18 is supported within and completely covers an opening 16 provided in an exterior housing 20 which accommodates the remaining components of the back light illumination system 2.

The light transmissive element 18 is provided with a central light transmissive area or portion 22, which is generally either square or rectangular in shape, and an opaque perimeter area or portion 24. The solid or opaque perimeter portion 24 is essentially a light trap which prevents any light from passing through that area or portion of the light transmissive element 18 while the light transmissive area or portion 22 allows essentially all, e.g. 100%, of the supplied light thereto to pass readily therethrough except that portion of the supplied light which is absorbed by the material. The light transmissive area or portion 22 could be, if desired, merely be an aperture provided in the light transmissive element 18, as noted above.

A first (front) surface 26 of a diffuser 28 is located closely adjacent or in an abutting engagement with a second (rear) surface 30 of the light transmissive element 18. The diffuser 28 may consist, for example, of a planar plate member formed of glass or plastic which has a surface that is translucent and capable of scattering or diffusing light passing through the diffuser. The diffuser 28 may alternatively be formed of an etched or ground glass, or may be formed of opal glass having light scattering centers of colloidal particles. Frosted glass, milky plastic or a Murata screen may also be used. Murata screen is formed of a diffusing synthetic plastic material. Alternatively, a holographic, light dispersing element may be used.

It is important that the diffuser 28 have wide-angle diffusing characteristics so that light cast thereon is evenly diffused by the diffuser 28 so that a substantially uniform intensity of light passes through the diffuser 28 for reflection toward the object 6.

It is to be appreciated that both the light transmissive element 18 and the diffuser 28 each define a plane P, P' (FIG. 1), respectively, which lie substantially horizontal and parallel to one another, i.e. within an angle of about ±10°. The light transmissive portion 22 and the diffuser 28 are located closely adjacent one another, e.g. only spaced from one another by a small distance, i.e. within about one half inch, if they are not in an abutting relationship. A second (rear) surface 32 of the diffuser 28 supports a transmissive right angle film 34. A suitable transmissive right angle film is manufactured by 3M Electronic Display Lighting, of St. Paul, Minn., under the tradename 3M™ TRAF II. The right angle film 34 generally operates to refract light, entering the rear surface 35 of the right angle film 34 at an angle of between about 0° and 20° relative to the plane P', toward the second surface 32 of the diffuser 28.

As can be seen in FIG. 2, two sets of rows or strings of illumination elements 38, 40 are aligned along opposed longitudinal edges of the back light illumination system 2.

The first string or row of illumination elements 38 is located at a concealed position within the housing 20 such that emitted light from the light source is completely absorbed or blocked, by the opaque perimeter portion 24, so that the light supplied by the first string or row of illumination elements 38 cannot be directly perceived by the entrance pupil 8 of the camera 10. That is, the supplied light from the first string or row of illumination elements 38 can only be indirectly received by the entrance pupil 8 of the camera 10 once it is appropriately refracted and scattered by the back light illumination system 2, according to the present invention. The second string or row of illumination elements 40 is similarly situated at a concealed position along an opposed longitudinal edge of the back light illumination system 2.

The first string or row of illumination elements 38 is powered, in a conventional manner, by a first power source 42. The second string or row of illumination elements 40 is similarly powered, in a conventional manner, by a second power source 44. Alternatively, the first and second strings or rows of illumination elements 38, 40 may be powered by a single power source. If separately powered, each one of the power sources 42, 44 is provided with a rheostat 46, 48, respectively, to control the illumination character and intensity of the light provided by the respective illumination elements 38, 40.

As can be seen in FIG. 2, the first and second rows or strings of illumination elements 38, 40 are spaced from the light transmissive area or portion 22 of the light transmissive element 18. That is, the element spacing 50 of a leading end of the first string or row of illumination elements 38 from the second row or string of illumination elements 40 is greater than the width of light transmissive area or portion 22 the while the first and second row or string of illumination elements 38, 40 each have an elongate length 52 which is greater than the length of the light transmissive area or portion 22. This lighting arrangement ensures that full and adequate light is supplied to the rear surface 35 of right angle film 34 so that the entire light transmissive area or portion 22 of the light transmissive element 18 is completely and adequately supplied with illumination of a substantially uniform intensity.

Figure 3:
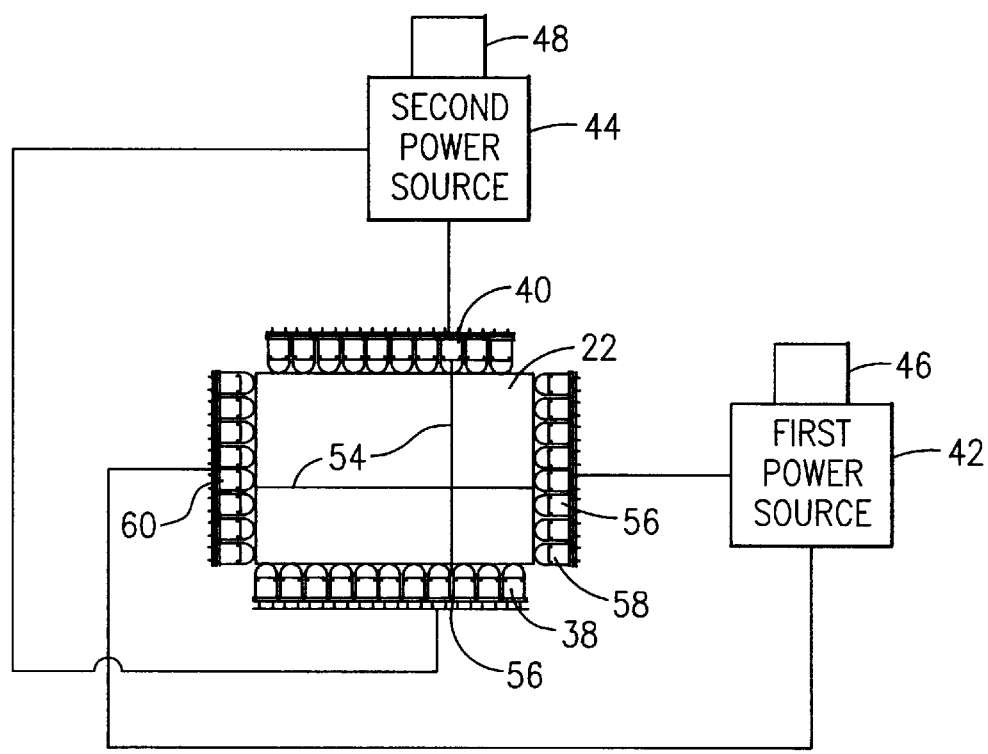
FIG. 3 is a diagrammatic plan view showing a second embodiment of the illumination elements according to the present invention.

In FIGS. 2 and 3, the staggering of the illumination element of the first string or row 38 with respect to the illumination element of the second string or row 40 can be seen. Each separate illumination element defines a longitudinal axis 54 which extends normal to the elongate length 52 of the first or second string or row of illumination elements 38, 40, shown in FIG. 2. The longitudinal axis 54 of each illumination element, of the string or row, is aligned with a midpoint 56 between two adjacent illumination elements positioned along the opposed side of the illumination system 2 to provide a staggered positioning of the illumination elements. The longitudinal axis 54, of adjacent illumination elements, are generally spaced as close as possible to one another. It is to be appreciated that the actual spacing of adjacent illumination elements can vary, from application to application, depending upon the type or kind of the LEDs employed, the size of the LEDs employed, etc. In a typically application, the center spacing of adjacent illumination elements is a distance 57 is between about 0.600 and about 0.050 inches and normally about 0.24 inches.

Further, by staggering the illumination elements along opposed edges of the illumination system, the gaps that would otherwise exist between the projected illumination beams from the adjacent LEDs are filled in and a substantially uniform illumination of the entire rear surface 35 of the right angle film 34 is achieved.

As also can be seen in FIG. 3, a third and fourth string or row of illumination elements 58, 60 can be provided. According to this embodiment, a first pair of strings or rows of illumination elements, e.g. illumination elements 58 and 60, are electrically coupled to the first power source 42 while a second pair of strings or rows of illumination elements, e.g. illumination elements 38, 40, are electrically coupled to the second power source 44. The first pair of strings or rows of illumination elements 58, 60 are also aligned in a staggered opposed relationship with respect to one another and generally emit light along axes extending substantially normal to the light generally emitted by the second pair of strings or rows of illumination elements 38, 40. This lighting arrangement improves and/or intensifies the amount of illumination provided to the rear surface 35 of the right angle film 34.

At least a portion 21 of the housing 20 is provided with a white, reflective light material or a mirror or mirror-like material to assist with reflecting any stray light from the illumination elements 38, 40, 58, 60 back toward the rear surface 35 of the right angle film 34. If desired, the entire inwardly facing bottom and side wall surfaces of the housing 20 can be similarly treated so that all of the inner surfaces of the housing 20 assist with reflecting the stray light toward the rear surface of the right angle film 34.

By the disclosed arrangement, the light enters the rear surface 35 of the right angle film 34, at an angle of between 0° and about 20°, and passes through the right angle film 34. The light is redirected toward the rear surface 32 of the diffuser 28. The light then passes completely through diffuser 28 and is supplied to the light transmissive element 18. From there the light passes through the light transmissive element 18 and is emitted from an outwardly facing surface of the light transmissive element 18 to illuminate the object 6 to be perceived by the camera 10.

Figure 4:
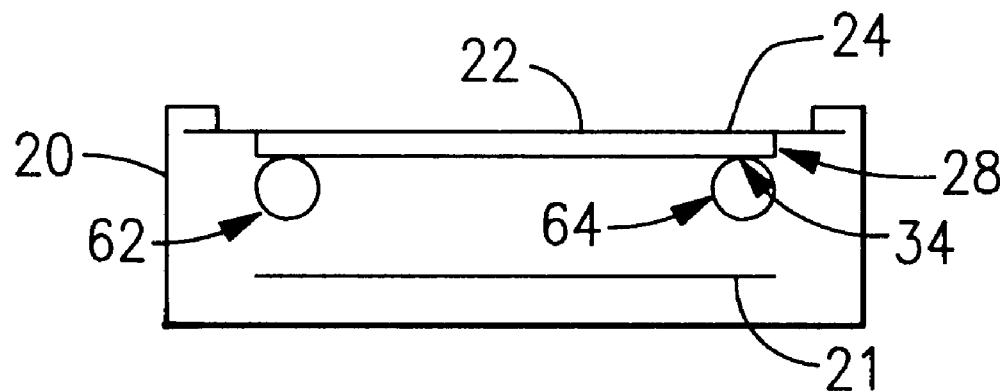
FIG. 4 is a diagrammatic elevational view showing use of two fluorescent light sources as the illumination elements.

Turning now to FIG. 4, a slight variation of the back light illumination system 2, according to the present invention, is shown. According to this embodiment, a pair of elongate fluorescent light sources 62, 64 replace the first and second strings or rows of illumination elements. The fluorescent light sources 62, 64 are also located closely adjacent the right angle film 34 so that the light is supplied to the right angle film 34 at a relatively shallow angle, e.g. at an angle of between 0° and 20°. As the fluorescent light sources 62, 64 are substantially continuous along their elongate length, they also facilitate the supply of a fairly uniform source of light to the rear surface 35 of the right angle film 34. As with the previous embodiment, a white reflective material 21 can line the entire bottom and/or inwardly facing surfaces of the housing 20 of the back light illumination system 2.

Figure 5:
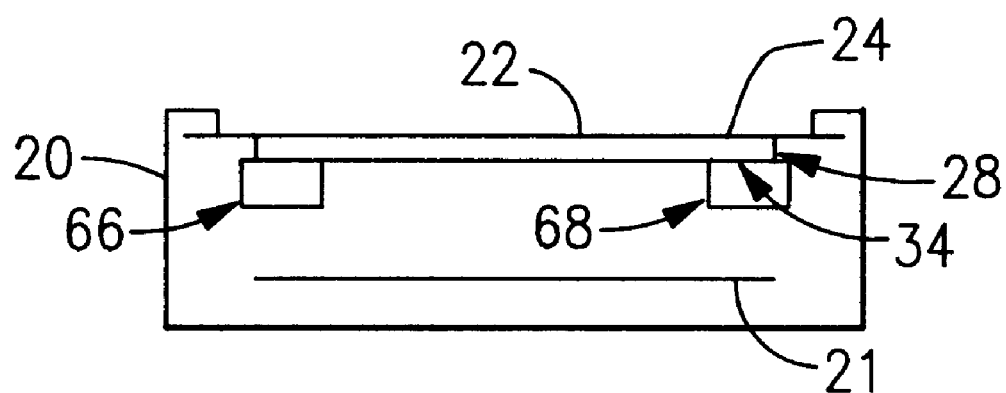
FIG. 5 is a diagrammatic elevational view showing two fiber optic light sources as the illumination elements.

With respect to FIG. 5, this embodiment is very similar to the embodiment of FIG. 4 except that the fluorescent light sources are replaced by a pair of fiber optic light sources 66, 68. In all other respects, this arrangement is substantially identical to the arrangement of FIG. 4. As with the previous embodiments, the embodiments of FIGS. 4 and 5 can be provided with a common or separable power sources and/or rheostats for controlling the intensity and/or the character of the light supplied by the fluorescent light sources 62, 64 and the fiber optic light sources 66, 68.

During use, light from the illumination elements 38, 40, 58, 60, 62, 64, 66 and 68 is emitted toward the rear plane P' of the right angle film 34. As the light enters from the rear surface 32 of the right angle film 34, the light is redirected and reflected substantially normal to the surface P' of the right angle film 34, i.e. within an angle of about ±30° of perpendicular to a rear surface 32 of the diffuser 28 due to the inherent refraction characteristics of the right angle film 34. As the redirected light, from the right angle film 34, enters the rear surface 32 of the diffuser 28, the light is appropriately altered, by the internal or inherent diffusing characteristics of the diffuser 28, and the light then exits from the front surface 26 of the diffuser 28. Due to this arrangement, the light emitted from the front surface 26 of the diffuser 28 is at a substantial equal intensity regardless of which point or area the light emanates from the front surface 26 of the diffuser 28. Any light which is scattered, by the diffuser 28, toward the opaque perimeter area or portion 24 is absorbed and not supplied towards the entrance pupil 8 of the camera 10.

The emitted substantially uniform light from the diffuser 28 then passes through the light transmissive area or portion 22 of the light transmissive element 18 and is supplied toward the object 6 to be observed or perceived. The light which strikes or contacts the exposed surface of the object 6 to be observed is either absorbed and/or reflected away from the entrance pupil 8 of the camera 10 by a surface of the object 6. The supplied light, which is not reflected or absorbed by the object 6, continues toward the entrance pupil 8 of the camera 10 and can be readily perceived by the machine vision system 12. In view of this illumination arrangement, each boundary between a "dark area" and a "bright area" defines a boundary of the object 6 to be observed.

As the light transmissive area or portion 22 emanates light which is of substantially uniform intensity, regardless of where the light emanates from the front surface of the light transmissive area or portion 22 of the light transmissive element 18, all of the light received by the entrance pupil 8 of the camera 10 is of a substantially uniform illumination. This illumination arrangement essentially eliminates "hot spots" which may occur in the prior art back light illumination systems.

It is to be appreciated that the light supplied by the each row or string of the illumination elements 38, 40, 58, 60, 62, 64, 66, and 68 to an adjacent portion of the right angle film 34 will have a much greater angle of incident than the angle of incident of the light supplied by the illumination elements 38, 40, 58, 60, 62, 64, 66 and 68 to a remote opposed portion of the right angle film 34. Nevertheless, the illumination elements are arranged so they each have an angle of incident, relative to the right angle film 34, of generally between 0° and 20° to ensure adequate refraction by the right angle film 34.

A variety of different light sources may be used as the illumination elements. The important requirement of the illumination elements is that they are capable of supplying light along the elongate length of the illumination system, to the rear surface 35 of the right angle film 34, so that the right angle film 34 supplies sufficient light to the rear surface 32 of the diffuser 28 which, in turn, may evenly diffuse the received light and uniformly illuminate the object 6.

It is to be appreciated that the size of the back light illumination system 2, according to the present invention, can be varied merely by increasing or decreasing the amount of illumination elements in the row or strings and/or increasing or decreasing the distance between the opposed illumination elements. Further, by increasing the spacing in between the opposed rows of illumination elements, this affects the uniformity and overall intensity of the illuminated area. That is, increasing the space between the opposed strings or rows of illumination elements degrades the uniformity and intensity of the illuminated area while decreasing the distance between the opposed rows or strings of illumination elements increases the uniformity and intensity of the illuminated area.

Since certain changes may be made in the above described back light illumination system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A back light illumination system for a machine vision system, said back light illumination system comprising:

a light transmissive element having an opaque portion and a light transmissive portion;

a diffuser substantially covering at least said light transmissive portion, and said diffuser having a first surface being located closely adjacent said light transmissive portion;

a second opposed surface of said diffuser having a right angle film located closely adjacent thereto for redirecting light supplied to the right angle film through the diffuser; and at least one light source being located to illuminate a rear surface of said right angle transmissive film, said at least one illumination source being located so as to only indirectly illuminate a camera of a machine vision system.

2. The back light illumination system according to claim 1, wherein said at least one light source comprises first and second strings of illumination elements provided for illuminating the rear surface of the right angle film and said first string of illumination elements are located in an opposed and alternating relationship with respect to said second string of illumination element, and spaced a distance from one another greater than a width of said light transmissive portion.

3. The back light illumination system according to claim 2, wherein said right angle film defines a plane and said illumination elements are arranged to supply light to a rear surface of said right angle film at an angle of incident of between about 0° to 20° relative to the plane of said right angle film.

4. The back light illumination system according to claim 2, wherein said first and second string of illumination elements are each coupled to a separate each said power source, and each power source has a rheostat for controlling an intensity of the light emitted by said illumination elements.

5. The back light illumination system according to claim 2, wherein said at least one light source comprises a pair of spaced apart fluorescent light sources.

6. The back light illumination system according to claim 2, wherein said at least one light source elements comprise a pair of spaced apart fiber optic light sources.

7. The back light illumination system according to claim 1, wherein said illumination elements of said first string of illumination elements comprise at least one elongate row of light emitting diodes which are closely spaced adjacent one another and said second string of illumination elements comprise at least one elongate row of light emitting diodes which are closely spaced adjacent one another and staggered with respect to the light emitting diodes of said first string.

8. The back light illumination system according to claim 7, wherein the light emitting diodes are spaced from one another by a distance of between about 0.050 and about 0.600 inches.

9. The back light illumination system according to claim 1, wherein first and second opposed pairs of light sources are provided for illuminating the rear surface of said right angle film, the first opposed pair of light sources define a first illumination axis extending in a first direction and the second opposed pair of light sources define a second illumination axis which extends substantially normal to the direction of the first illumination axis.

10. The back light illumination system according to claim 1, wherein said back light illumination system includes a housing for containing said diffuser, said right angle film and said at least one light source, and an internal surface of said housing is provided with a reflective material for reflecting stray light toward said right angle film.

11. The back light illumination system according to claim 1, in combination with a camera, with an inlet pupil, which is electrically coupled to a vision system, said camera is positioned such that the inlet pupil of said camera is located to perceive light emanated from said light transmissive portion of said light transmissive element but unable to receive light directly supplied by said at least one light source.

12. The back light illumination system according to claim 11, wherein a pair of strings of illumination elements are spaced from one another by distance greater than a width of said light transmissive portion and each string of illumination elements has a length greater than a length of said light transmissive portion.

13. The system according to claim 1, further comprising a vision system which is electrically coupled to said back light illumination system, a computing mechanism which is electrically coupled to said vision system, and a conveying mechanism which is electrically coupled to said computing mechanism, and said vision system supplies a sensed image of an object to be observed to said computing mechanism which determines one of a characteristic and a feature of said object and outputs a signal to said conveying mechanism to control further manipulation of said object in view of one of said characteristic and feature.

14. A method of providing back light illumination for a machine vision system, said method comprising the steps of:
   providing a light transmissive element having an opaque portion and a central light transmissive portion;
   substantially covering at least said light transmissive portion with a diffuser, and said diffuser having a first surface being located closely adjacent said light transmissive portion;
   providing a right angle film closely adjacent to a second opposed surface of said diffuser for redirecting light supplied to the right angle film through the diffuser; and
   locating at least one light source to illuminate a rear surface of said right-angle transmissive film, said at least one illumination source being located so as to only indirectly illuminate a camera of a machine vision system.

15. The method of back light illumination system according to claim 14, further comprising the step forming said at least one light source, for illuminating the rear surface of the right angle film, from first and second strings of illumination elements and locating said first string of illumination elements in an opposed relationship with respect to said second string of illumination element, and spacing said first and second strings of illumination elements from one another a distance greater than a width of said light transmissive portion.

16. The method according to claim 15, further comprising the steps of defining a plane with said right angle film and arranging said illumination elements to supply light to a rear surface of said right angle film at an angle of incident of between about 0° to 20°.

17. The method according to claim 14, further comprising the steps of providing a first string of illumination elements which comprises an elongate row of light emitting diodes that are closely spaced adjacent one another and providing a second string of illumination elements which comprises an elongate row of light emitting diodes which are closely spaced adjacent one another, and staggering the light emitting diodes of the second string with respect to the light emitting diodes of said first string.

18. The method according to claim 14, further comprising the steps of providing first and second opposed pairs of light sources for illuminating the rear surface of said right angle film, defining a first illumination axis with the first opposed pair of light sources and defining a second illumination axis, extends substantially normal to the first illumination axis, with the second pair of light sources define.

19. The method according to claim 14, further comprising the steps of using a pair of spaced apart fluorescent light sources as said at least one light source.

20. The method of according to claim 14, further comprising the steps of using a pair of spaced apart fiber optic light sources as said at least one light source.

21. The method according to claim 13 further comprising the steps of electrically coupling a camera, with an inlet pupil, to a vision system, positioning said camera such that the inlet pupil of said camera is located to perceive light emanated from said light transmissive portion of said light transmissive element but unable to perceive light directly supplied by said at least one light source.

22. The method of claim 14 further comprising the steps of:
   electrically coupling a vision system to said back light illumination system;
   electrically coupling a computing mechanism to said vision system;
   electrically coupling a conveying mechanism to said computing mechanism; and
   supplying a sensed image of an object to be observed to, via said vision system, to said computing mechanism which determines one of a characteristic and a feature of said object and outputs a signal to said conveying mechanism to control further manipulation of said object in view of one of said characteristic and feature.

* * * * *